United States Patent
Melchger

(10) Patent No.: US 6,234,567 B1
(45) Date of Patent: May 22, 2001

(54) VEHICLE ROOF WITH A ROOF CUTOUT AS WELL AS A WIND DEFLECTING PROFILE THEREFOR

(75) Inventor: Nicolai Melchger, Wildberg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/438,314

(22) Filed: Nov. 12, 1999

(30) Foreign Application Priority Data

Nov. 19, 1998 (DE) .............................................. 198 53 358

(51) Int. Cl.[7] .................. B60J 1/00; B60J 7/00; B60J 9/00; B60K 37/00; B60N 2/00
(52) U.S. Cl. ......................................... 296/180.1; 296/217
(58) Field of Search ................................. 296/180.1, 217

(56) References Cited

U.S. PATENT DOCUMENTS

| | | |
|---|---|---|
| 3,156,175 | 11/1964 | Werner . |
| 4,630,859 * | 12/1986 | Bienert et al. . |
| 4,681,364 * | 7/1987 | Bienert et al. . |
| 5,052,745 | 10/1991 | Preiss ................................... 296/217 |

FOREIGN PATENT DOCUMENTS

| | | |
|---|---|---|
| 3146908A1 | 6/1983 | (DE) . |
| 3333215 * | 3/1985 | (DE) . |
| 3913567 * | 10/1990 | (DE) . |
| 4012569C1 | 5/1991 | (DE) . |
| 4222700 * | 6/1993 | (DE) . |
| 4126568C2 | 8/1993 | (DE) . |
| 446016C1 | 1/1996 | (DE) . |
| 19518774A1 | 11/1996 | (DE) . |
| 747 251 | 5/1996 | (EP) . |
| 453086 * | 9/1936 | (GB) . |
| 2110749 * | 6/1983 | (GB) . |
| 136384 | 9/1984 | (JP) . |

OTHER PUBLICATIONS

Office Action dated May 5, 2000 with English translation.
Copy of Search Report from UK Patent Office, Feb. 2000.

* cited by examiner

*Primary Examiner*—D. Glenn Dayoan
(74) *Attorney, Agent, or Firm*—Evenson, McKeown, Edwards & Lenahan, P.L.L.C.

(57) ABSTRACT

A vehicle roof with a roof cutout can be closed by a movable roof part arrangement, with which cutout a wind deflecting profile is associated in the vicinity of a leading edge of a wind deflecting profile, the profile being movably mounted between a resting position and a functional position. According to the invention, at least one upwardly projecting exciting edge as well as at least one elastically flexible disturbing lip located in the wake of the exciting edge are associated with the wind deflecting profile.

21 Claims, 1 Drawing Sheet

VEHICLE ROOF WITH A ROOF CUTOUT AS WELL AS A WIND DEFLECTING PROFILE THEREFOR

BACKGROUND AND SUMMARY OF THE INVENTION

This application claims the priority of German application 198 53 358.6, filed Nov. 9, 1998 in Germany, the disclosure of which is expressly incorporated by reference herein.

The invention relates to a vehicle roof with a roof cutout that can be closed by a movable roof part arrangement, with which cutout a wind deflecting profile is located in the vicinity of one end which is at the front in the normal direction of travel, said profile being movably mounted between a resting position and a functioning position.

Such a vehicle roof is known from German Patent Document DE 40 12 569C1. In the known vehicle roof of an automobile, a roof opening that can be closed by a sliding roof is provided. At the front of the roof opening in the normal direction of travel, a pivotably movable wind deflecting profile is provided. When the sliding roof is closed, the wind deflecting profile projects beyond the surface of the roof in its functional position. The portion of the wind deflecting profile that projects above the surface of the roof is provided with a plurality of cam-shaped profile sections arranged at uniform intervals with respect to one another in the transverse direction of the vehicle, said sections projecting upward and constituting raised bodies. Plane clear recesses are formed between the individual raised bodies. This shape of the wind deflecting profile is intended to reduce or eliminate so-called "drumming" in the vehicle interior at certain vehicle speeds when the sliding roof is open.

Another vehicle roof with a roof cutout is known from German Patent Document DE 41 26 568 C2, said cutout being closable by a sliding roof. This roof cutout also has a wind deflecting profile in the vicinity of its leading edge, said profile being provided with a short upwardly extending flow deflecting projection in the vicinity of its area that projects in the functional position above the surface of the roof. This deflecting projection is intended to form an extremely energy-rich U-shaped vortex when the motor vehicle is in motion which destroys ordered flow structures running in the same direction that extend from the other rectilinear edge areas of the wind deflecting profile, in the vicinity of the sliding roof opening. The incident air flow is intended to roll up on the symmetrical U-shaped vortex so that the "drumming" in the vehicle interior can be reduced or eliminated.

German Patent Document DE 3146 908 A1 (corresponding to UK Patent Application GB 2 110 749 A) describes a marginal gap seal for a motor vehicle sliding roof which, when the sliding roof is opened, has a diagonally and upwardly projecting external roof area that serves as a wind deflecting area. The external roof area is abutted by an internal roof area provided with three sealing ribs projecting at right angles for a sealing support on a lower side of the sliding groove.

A goal of the invention is to provide a vehicle roof of the type recited at the outset which reliably avoids "drumming" in the vehicle interior regardless of the vehicle speed when the roof cutout is open.

This goal is achieved by virtue of the fact that at least one upwardly projecting exciting edge as well as at least one elastically flexible disturbing lip are arranged in the wake of the exciting edge. The exciting edge preferably extends continuously in the transverse direction of the vehicle over the entire length of the wind deflecting profile and hence essentially over the entire width of the roof cutout. The disturbing lip also extends over the same length and therefore over nearly the entire width of the roof cutout. The exciting edge acts as a dimensionally stable disturbing body for the incident relative wind. The adjoining elastically flexible disturbing lip, as a result of its position in the wake of the exciting edge, moves when the vehicle is in operation so that it oscillates, vibrates, flutters, or moves alternately back and forth in some other fashion at uniform or nonuniform frequencies under the influence of the incident relative wind. As a result, the drumming noise that disturbs the vehicle interior is sharply reduced or eliminated completely. The solution according to the invention can be produced very simply, has an improved effect by comparison to the prior art, and guarantees an appropriate overall visual appearance. The exciting edge can project upward diagonally or vertically in the functional position of the wind deflecting profile. The exciting edge can also be made movable and moved into its stable functional position only when the wind deflecting profile is extended into the relative wind. The exciting edge can also be composed of a plurality of sections adjoining one another transversely to the flow direction. A one-piece sliding roof, a multipartite lamellar roof, a folding roof, or the like can be provided as the movable roof part arrangement. By providing the exciting edge and the disturbing lip on the wind deflecting profile, no additional space for positioning the exciting edge is required in a separate area of the vehicle roof or of the edge of the roof cutout.

In certain preferred embodiments of the invention, the exciting edge is formed in one piece on an upper side of the wind deflecting profile. Consequently, the wind deflecting profile can be manufactured especially simply.

In certain preferred embodiments of the invention, the disturbing lip is made of rubber and permanently attached to the wind deflecting profile. The deflecting lip is attached to the wind deflecting profile in such fashion that it projects diagonally or vertically upward from the wind deflecting profile into the wake of the exciting edge.

In certain preferred embodiments of the invention, the disturbing lip is provided with a profile foot held in a matching receiving groove, with the receiving groove being open at at least one end. It is therefore possible to push the disturbing lip in simple fashion from the end into the receiving groove and thus to produce a reliable seat for the disturbing lip on the wind deflecting profile.

Other objects, advantages and novel features of the present invention will become apparent from the following detailed description of the invention when considered in conjunction with the accompanying drawings.

DETAILED DESCRIPTION OF THE DRAWINGS

Figure 1:
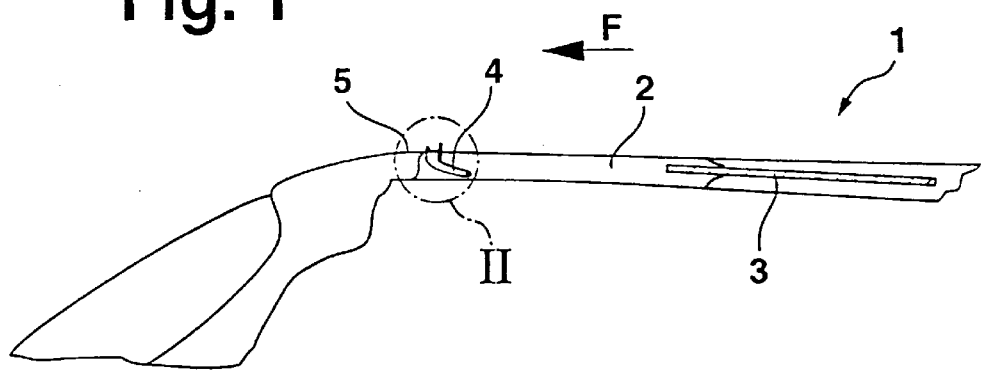
FIG. 1 shows schematically, in a partially cut-open side view, an embodiment of a vehicle roof according to the invention for an automobile with an open sliding roof.
Figure 2:
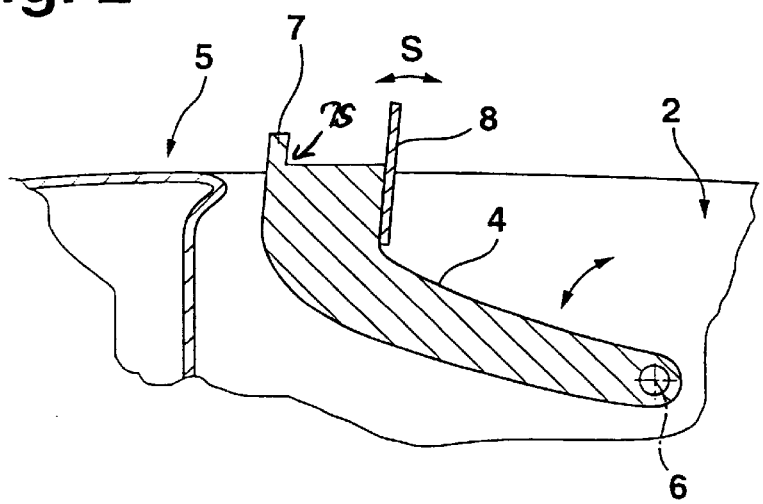
FIG. 2 shows in an enlarged section, a portion II of the vehicle roof according to FIG. 1.

A vehicle roof 1 of an automobile, according to FIGS. 1 and 2, has a roof cutout 2 that can be closed by a sliding roof 3. In order to avoid strong suction phenomena in the vehicle interior as a result of relative wind flows when the automobile is being driven with roof cutout 2 open, in other words with sliding roof 3 slid rearward opposite to a forward direction of travel F, a wind deflecting profile 4 is provided in the vicinity of a forward edge 5 of roof cutout 2, said profile according to FIG. 2, being mounted to be pivotably movable in the direction of the double arrow around a pivot axis 6 extending in the transverse direction of the vehicle. Thus, wind deflecting profile 4 is in a lowered resting position when sliding roof 3 is closed. When sliding roof 3 is open, wind deflecting profile 4 is pivoted automatically, preferably by spring force, into the functional position shown in FIGS. 1 and 2, in which an upper area of wind deflecting profile 4 projects above the surface of the vehicle roof and thus into the relative wind flow.

Wind deflecting profile 4 extends over the entire width of roof cutout 2 in the transverse direction of the vehicle and is manufactured as a one-piece profile body, preferably from plastic. The upper area of wind deflecting profile 4 is provided in the vicinity of its edge, at the front as viewed in the direction of travel F, with an exciting edge 7 that projects upward ribwise, said edge thus projecting above wind deflecting profile 4 in the functional position approximately vertically upward into the relative wind flow. As a result of exciting edge 7, in the adjoining upper area of wind deflecting profile 4 a step-shaped shoulder 7S is produced by which a vorticization of the relative wind flow is produced in the wake located behind exciting edge 7.

In this wake, an elastically flexible disturbing lip 8 is also located that is secured to a rear trailing edge of wind deflecting profile 4 and projects approximately vertically upward above the upper part of wind deflecting profile 4. Disturbing lip 8 also extends above exciting edge 7, with disturbing lip 8 in the embodiment shown projecting for twice the height of exciting edge 7 from the upper part of wind deflecting profile 4. In its freely upwardly projecting area, disturbing lip 8 is designed to be elastically flexible so that it performs alternating tilting movements in the direction of double arrow S depending on the relative wind flow vorticized in the wake of exciting edge 7. Disturbing lip 8 also extends over the entire length of wind deflecting profile 4 in the transverse direction of the vehicle and thus over approximately the entire width of roof cutout 2. In the embodiment shown, disturbing lip 8 is made of rubber and has its lower portion vulcanized to the rear trailing edge of wind deflecting profile 4. Disturbing lip 8 can be secured to wind deflecting profile 4 in another fashion according to other contemplated embodiments. It is also possible to make the disturbing lip of an elastomer other than rubber.

As a result of the combination of exciting edge 7 and the disturbing lip 8 that oscillates when driving, drumming noises and the suction phenomena they cause in the vehicle interior are at least largely avoided independently of the speed of travel.

Figure 3:
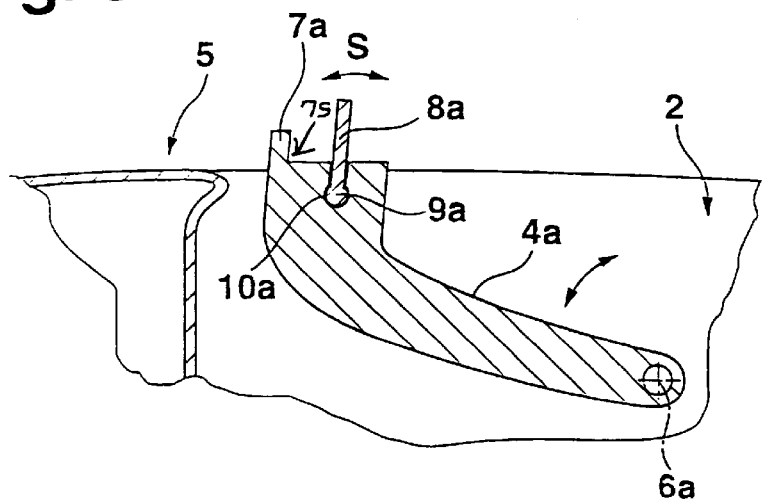
FIG. 3, in a section similar to FIG. 2, shows another cutout of a vehicle roof according to the invention with a modified wind deflecting profile.

A wind deflecting profile 4 according to FIG. 3 corresponds in its basic design and basic function to wind deflecting profile 4 according to FIGS. 1 and 2 so that in the following only the differences relative to the embodiment according to FIG. 3 will be discussed. In wind deflecting profile 4a, disturbing lip 8a is likewise positioned behind exciting edge 7a in the direction of travel, but in the present case it is integrated into wind deflecting profile 4a. For this purpose, a receiving groove 10a is provided in the top of the wind deflecting profile, said groove extending in the transverse direction of the vehicle and open at one or both ends. Disturbing lip 8a is designed with a profile that matches the hollow profile of receiving groove 10a, having at its lower end a cylindrical thickened profile foot which ensures a dimensionally stable locked position in matching receiving groove 10a. Disturbing lip 8a can thus be inserted in simple fashion from the side into receiving groove 10a of wind deflecting profile 4a, and preferably has the same length as receiving groove 10a. Disturbing lip 8a, together with its profile foot 9a is adjusted to the dimensions of receiving groove 10a so that the lateral inward pull takes place with expenditure of force so that disturbing lip 8a is positioned forcewise in the transverse direction of the vehicle. Upward release of disturbing lip 8a from wind deflecting profile 4a is prevented by the clamping action between profile foot 9a and receiving groove 10a.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Vehicle roof with a roof cutout that can be closed by a movable roof part arrangement, with which cutout a wind deflecting profile is associated in the vicinity of an edge that leads in the normal direction of travel, said profile being movably mounted between a resting position and a functioning position, wherein the wind deflecting profile includes at least one upwardly projecting exciting edge, and at least one elastically flexible disturbing lip located in a wake of the exciting edge and deflected in relation to the wind deflecting profile by the wake such that drumming noises are substantially avoided.

2. Vehicle roof according to claim 1, wherein the exciting edge is formed integrally on an upper side of the wind deflecting profile.

3. Vehicle roof according to claim 1, wherein the disturbing lip is made of rubber and permanently connected with the wind deflecting profile.

4. Vehicle roof according to claim 2, wherein the disturbing lip is made of rubber and permanently connected with the wind deflecting profile.

5. Vehicle roof according to claim 1, wherein the disturbing lip is provided with a profile foot, said foot being held in a matching receiving groove of the wind deflecting profiles, said receiving groove being open at at least one end to facilitate assembly and disassembly of the disturbing lip.

6. Vehicle roof according to claim 2, wherein the disturbing lip is provided with a profile foot, said foot being held in a matching receiving groove of the wind deflecting profiles, said receiving groove being open at at least one end to facilitate assembly and disassembly of the disturbing lip.

7. Wind deflecting profile for a vehicle roof of a motor vehicle, comprising:

a wind deflecting profile member which in use extends laterally across a vehicle roof opening, said wind deflecting profile member having an exciting edge at its forward in use end to deflect an incident relative wind, and a disturbing lip connected with the wind deflecting profile member and disposed behind the exiting edge, said disturbing lip being formed of elastic material and operable to elastically deflect in relation to the wind deflecting profile in response to air flow of the deflected incident relative wind such that drumming noises are substantially avoided.

8. Wind deflecting profile according to claim 7, wherein the exciting edge is formed integrally on an upper side of the wind deflecting profile.

9. Wind deflecting profile according to claim 7, wherein the disturbing lip is made of rubber and permanently connected with the wind deflecting profile.

10. Wind deflecting profile according to claim 8, wherein the disturbing lip is made of rubber and permanently connected with the wind deflecting profile.

11. Wind deflecting profile according to claim 7, wherein the disturbing lip is provided with a profile foot, said foot being held in a matching receiving groove of the wind deflecting profiles, said receiving groove being open at at least one end to facilitate assembly and disassembly of the disturbing lip.

12. Wind deflecting profile according to claim 8, wherein the disturbing lip is provided with a profile foot, said foot being held in a matching receiving groove of the wind deflecting profiles, said receiving groove being open at at least one end to facilitate assembly and disassembly of the disturbing lip.

13. Wind deflecting profile according to claim 7, comprising a pivot connection means accommodating pivotal connection of the wind deflecting profile member at a vehicle roof.

14. Wind deflecting profile according to claim 7, wherein a pivot connection means is disposed rearwardly of the exiting edge and disturbing lip in an installed position of the wind deflecting profile member at a vehicle roof opening.

15. A passenger vehicle comprising:

a vehicle roof, a roof cut out opening, a movable roof cut out cover assembly operable to selectively open and close the roof cut out opening, and a wind deflecting profile assembly disposed in a forward area of the roof cut out and operable to attenuate wind noises in the vehicle when driving with the roof cut out opening open, wherein the wind deflecting profile includes at least one upwardly projecting exciting edge, and wherein at least one elastically flexible disturbing lip is carried by the deflecting profile located in a wake of the exciting edge and deflected in relation to the wind deflecting profile by said wake such that drumming noises are substantially avoided.

16. A passenger vehicle according to claim 15, wherein the exciting edge is formed integrally on an upper side of the wind deflecting profile.

17. A passenger vehicle according to claim 15, wherein the disturbing lip is made of rubber and permanently connected with the wind deflecting profile.

18. A passenger vehicle according to claim 15, wherein the disturbing lip is provided with a profile foot, said foot being held in a matching receiving groove of the wind deflecting profiles, said receiving groove being open at at least one end to facilitate assembly and disassembly of the disturbing lip.

19. A passenger vehicle according to claim 15, wherein said exciting edge forms a step shoulder with an adjoining section of the profile member which carries the disturbing lip.

20. A passenger vehicle according to claim 19, wherein, in an in use position, the disturbing lip extends above the exciting edge.

21. Wind deflecting profile according to claim 13, wherein said pivot connection means is disposed rearwardly of the exiting edge and disturbing lip in an installed position of the wind deflecting profile member at a vehicle roof opening.

* * * * *